United States Patent [19]

Urschel III et al.

[11] 4,026,716

[45] May 31, 1977

[54] CONCRETE COMPOSITION

[75] Inventors: George C. Urschel III, Toledo; George G. Judd, Woodville, both of Ohio

[73] Assignee: Woodville Lime and Chemical Company, Woodville, Ohio

[22] Filed: June 28, 1976

[21] Appl. No.: 700,508

Related U.S. Application Data

[63] Continuation-in-part of Ser. No. 558,944, March 17, 1975, abandoned.

[52] U.S. Cl. .................................... 106/97; 106/89
[51] Int. Cl.$^2$ ........................................... C04B 7/02
[58] Field of Search ................................ 106/89, 97

[56] References Cited

UNITED STATES PATENTS

| | | | |
|---|---|---|---|
| 2,315,732 | 4/1943 | Patch ................................... | 106/97 |
| 2,758,033 | 8/1956 | Burney et al. ....................... | 106/97 |

FOREIGN PATENTS OR APPLICATIONS

| | | | |
|---|---|---|---|
| 800,639 | 12/1968 | Canada ............................... | 106/97 |

*Primary Examiner*—Patrick P. Garvin
*Assistant Examiner*—John P. Sheehan
*Attorney, Agent, or Firm*—John C. Purdue

[57] ABSTRACT

A high compressive strength concrete is disclosed. The concrete is formed by mixing with water a general-use cement, dolomitic limestone as a low-silica manufactured fine aggregate, and from about 5 to 15 percent by weight, based on the manufactured fine aggregate, of a precipitate comprising CaO-MgO from the gaseous effluent from a kiln burning dolomitic limestone, and curing the mixture.

6 Claims, No Drawings

CONCRETE COMPOSITION

REFERENCE TO RELATED APPLICATION

This is a continuation-in-part of our copending application Ser. No. 558,944, filed Mar. 17, 1975. and now abandoned.

BACKGROUND OF THE INVENTION

The present invention is directed to an improved concrete composition.

With the increasing demand for cementitious products in the building industry, particularly in structures such as buildings, dams, roads, and the like, there is a need for ways of improving the quality of cementitious products without increasing the cost. Due to the trend of increasing manufacturing costs including labor, raw materials and fuels, there is a continuing interest in additive materials which can be mixed with concrete to increase the compressive strength, or which can be used to reduce the amount of cement necessary, while at the same time maintaining the desired compressive strength in the cured concrete.

Concrete is made from a mixture of Portland cement, fine and coarse aggregate usually in the form of sand and gravel or crushed stone, and water. Small amounts of other materials can be added to promote or retard the reactions or to give desired qualities to the cement paste.

Portland cement is essentially a calcium-alumina-magnesia-silicate composition. Addition of the water to the dry mixture commences a series of crystallization reactions by virtue of which the concrete attains the strength necessary for use in building products. Because of the complexity of the chemical reactions leading to concrete formation, researchers have investigated both the reaction conditions and reactants to determine their effect on the cured concrete. These research findings have influenced the establishment of uniform quality standards for cement set forth by the American Society for Testing Materials (ASTM).

Concrete compositions may be modified by the addition of silica and alumina-containing substances known as pozzolana. These materials in themselves have no cementitious or binding quality but react with the lime in the presence of water to form cementitious materials. Pozzolanas are materials such as fly ash, and silica-containing substances such as powdered brick, burnt shale and some of the slags Fly ash, produced from the burning of pulverized bituminous coal and collected in large quantities by electrostatic precipitation has been suggested as a suitable fine aggregate for concrete. For example, Nelles U.S. Pat. No. 2,250,107 discloses the use of a fly ash having an approximate chemical composition of about 43 percent silica, 25 percent alumina, 15 percent iron oxide, 2 percent calcium oxide and 1 percent magnesia.

During kilning operations to produce commercial grade lime, by driving off $CO_2$ from quarried limestone, a severe "dusting" problem is encountered. Environmental concerns have led to the extensive use of electrostatic precipitators to collect this lime dust in order to reduce or eliminate discharge into the air. Fine aggregates have been deemed unsuitable for use in concrete if high in magnesia content; in fact, a magnesia content in Portland cement of more than 5 percent is considered deleterious and is not permitted by ASTM specifications. Heretofore the lime dust from lime kilning operations has not been utilized, but has been largely disposed of by land-fill methods such as disposal in the inactive portion of the limestone quarry.

SUMMARY OF THE INVENTION

The instant invention is based upon the discovery that a precipitate comprising CaO-MgO from the gaseous effluent from a kiln burning dolomitic limestone can be used in a cementitious structural composition. The presence of from 5 to 15 percent by weight of this precipitate, based upon a fine aggregate, increases the compressive strength up to about 15 percent. Alternately, the amount of Portland cement in the composition can be reduced and the compressive strength maintained at a high level. The precipitate, on an oxide basis, contains about 35 percent by weight CaO and about 26 percent by weight MgO; the average particle size of the precipitate is less than 5 microns. From about 1 to 6 percent of the precipitate based on total dry batch weight, can be used in the composition. The precepitate can be recovered from the gaseous effluent from a kiln burning dolomitic limestone by electrostatic precipitation, by scrubbing or by means of a bag house.

Accordingly, it is a primary object of this invention to provide a concrete composition containing high MgO dust recovered from a kiln burning dolomitic lime.

Another object of this invention is to provide a concrete composition wherein the amount of cement present can be reduced, while maintaining the desired compressive strength.

Other objects and advantages of the invention will become apparent from the following detailed description.

In the Examples, as elsewhere herein, the terms "parts" and "percent" refer to parts by weight and percent by weight. All sizing is reported as standard mesh per linear inch, Tyler screen series; the batches were prepared on the basis of 5.5 sacks of Portland cement per batch, unless otherwise indicated.

EXAMPLE I

A composition according to the instant invention was prepared by dry-mixing coarse aggregate limestone, Type I Portland cement, manufactured fine aggregate and 5 percent by weight of precipitate from a kiln burning dolomitic limestone, based on the manufactured fine aggregate. Water was then added to the dry mix and the composition mixed for 5 minutes. The batch proportions are indicated below:

| | Weight (Pounds) |
|---|---|
| Type I-A cement | 517 (5.5 sacks) |
| Manufactured fine aggregate | 1425 |
| Limestone aggregate | 1750 |
| Electrostatic precipitator lime | 75 |
| Water | 30.5 gallon/cubic yd. |
| | (6.20 gallon/sack of cement) |
| Air-entraining agent* | 1.75 oz./sack cement |

*The agent used improves the durability of concrete and is commercially available from Dewey & Almy Chemical Company under the designation Darex.

Cylindrical samples, having a nominal size of 6 by 12 inches, were prepared. The cylinders were cured for 2 days under ambient conditions and then allowed to cure in a moisture cabinet at 70° F. and 95 percent humidity for a period of 26 days. The cylinders were then subjected to applied pressure and the compressive strength measured. Compressive strengths of the samples are shown below in Table I.

TABLE I

| AGE (Days) | COMPRESSIVE STRENGTH (Pounds/sq. inch) |
|---|---|
| 3 | 2317 |
| 3 | 2299 |
| 7 | 2617 |
| 7 | 2564 |
| 14 | 3059 |
| 14 | 2776 |
| 28 | 3325 |
| 28 | 3378 |

The limestone used in Example I was coarse aggregate, number 57 stone which had a screen analysis from 1 inch mesh to No. 4 mesh.

The precipitate used in Example I was electrostatically precipitated from the gaseous effluent of a kiln burning dolomitic limestone, and had the following approximate analysis:

|  | Percent by Weight |
|---|---|
| CaO | 35 |
| MgO | 26 |
| S | 1 |
| Loss on Ignition | 36 |
| $SiO_2, R_2O_3, Fe_2O_3$ | Remainder |

Based upon the above table the particular electrostatic precipitate sample had a calcium content calculated as CaO of about 35 percent by weight and a magnesium content calculated as MgO of about 26 percent by weight.

The pecipitate had an average particle size less than 5 microns.

It will be appreciated that the manner in which a precipitate is recovered from the gaseous effluent from a kiln burning dolomitic limestone is not material. That used in the procedure which provided the data for Example I was recovered by electrostatic precipitation, but precipitate recovered by washing the gaseous effluent, e.g., with water sprays, or using a bag house can also be used. The composition of the dust from a kiln burning dolomitic limestone varies depending upon the composition of the limestone being burned. For example, chemical analyses of the dust conducted on eight different days gave the following typical weight percent analyses:

|  | 1 | 2 | 3 | 4 | 5 | 6 | 7 | 8 |
|---|---|---|---|---|---|---|---|---|
| CaO | 38.1 | 34.7 | 35.3 | 35.8 | 34.4 | 35.8 | 35.6 | 37.0 |
| MgO | 30.4 | 25.9 | 36.1 | 32.0 | 26.2 | 26.0 | 25.4 | 26.7 |

Based upon the above table the dust contains from about 34.4 to 38.1 percent by weight calcium, calculated as CaO and from about 25.4 to 36.1 by weight magnesium, calculated as MgO.

The manufactured fine aggregate referred to above was obtained from the operation of a dolomitic limestone quarry. During the operation, the quarried material which passes through an 8 mesh screen is thoroughly washed. The washing takes place in a washer having two rotary screws which in turn counter to each other. The activity of the running water in the washer keeps the fines in suspension and removes the fines from the coarser material present. The material obtained from the washing operation is a high CaO-MgO aggregate, low in silicate, having a particle sizing essentially 8 mesh to 100 mesh. Typical chemical analysis and screen analysis of the manufactured fine aggregate, referred to in the trade as "manufactured sand, " is shown below. Depending on the operation of the quarry, the composition of the fine aggregate will vary somewhat.

|  | Percent by Weight |
|---|---|
| Loss on Ignition | 47 |
| CaO | 30 |
| MgO | 22 |
| $SiO_2$ | 0.15 |
| $R_2O_3$ | Remainder |

Based upon the above table the manufactured fine aggregate contains about 30 percent by weight calcium, calculated as CaO and about 22 percent by weight magnesium, calculated as MgO.

The manufactured fine aggregate had the following screen analysis:

| Screen | Percent Cumulative | Percent Pass |
|---|---|---|
| 4 | 0 | 100 |
| 8 | 1.4 | 98.6 |
| 16 | 37.8 | 62.2 |
| 30 | 65.3 | 34.7 |
| 50 | 82.9 | 17.1 |
| 100 | 94.6 | 5.4 |
| 200 | 98.7 | 1.3 |

EXAMPLE II

A series of compositions was prepared to determine the effect of increasing the amount of kiln dust present in the composition. Based on a control sample containing 1500 pounds of manufactured fine aggregate, 10 and 15 percent, respectively, of the manufactured aggregate was replaced by the kiln dust. Based on the total dry batch weight, the amount of precipitator lime present was increased to 4 and 6 percent by weight, respectively, in comparison to the 2 percent by weight described in Example I.

| Sample | Kiln Dust | Type I-A Cement | Weight (Pounds) Manufactured Fine Aggregate | Limestone Aggregate | Electrostatic Precipitator Lime | Water Gal./ Cu. Yd. | Water Gal./ Sack | Air-entraining Agent (per sack cement) |
|---|---|---|---|---|---|---|---|---|
| Control | — | 517 (5.5 Sacks) | 1500 | 1750 | — | 30.01 | 6.11 | 2.0 oz. |
| 2 | 10 | 517 (5.5 Sacks) | 1350 | 1750 | 150 | 34.93 | 6.90 | 1.75 oz. |
| 3 | 15 | 517 (5.5 Sacks) | 1275 | 1750 | 225 | 36.01 | 7.09 | 1.75 oz. |

The compressive strength of the compositions was determined as described in Example I:

TABLE II

| Sample | Kiln Dust | COMPRESSIVE STRENGTH (psi) | | | | | | | |
|---|---|---|---|---|---|---|---|---|---|
| | | 3 | 3 | 7 | 7 | Days Aged 14 | 14 | 28 | 28 |
| Control | — | 2211 | 2158 | 2723 | 2776 | 2794 | 2918 | 3165 | 3290 |
| 2 | 10 | 2600 | 2600 | 2935 | 3006 | 3290 | 3254 | 3643 | 3714 |
| 3 | 15 | 2565 | 2547 | 3006 | 3077 | 3165 | 3148 | 3732 | 3661 |

The test data shown in Example I and Example II indicates that the presence of from 1 to 6 percent by weight of kiln dust, based on total dry batch weight, as a substitute for manufactured fine aggregate, increases the compressive strength of the concrete composition up to 15 percent.

Because concrete is sold on a strength basis, that is, the compressive strength obtained from a given concrete mixture, the increase in compressive strength obtained by the presence of the kiln dust can be used in various ways. For example, while the test results show a sharp increase in compressive strength for substitution of the manufactured fine aggregate by kiln dust, it is apparent that the amount of portland cement present in the composition can be reduced and a high compressive strength maintained. Such an expedient is of great value, since the cost of portland cement contributes substantially to the cost of concrete. Accordingly, a batch composition was prepared in which the amount of portland cement present was reduced from 5.5 sacks to 4.5 sacks.

EXAMPLE III

A composition according to the instant invention, designated as Sample 4, was prepared and tested as described in Example I. The batch proportions are indicated below.

| | Weight (Pounds) |
|---|---|
| Type I-A cement | 423 (4.5 Sacks) |
| Manufactured fine aggregate | 1435 |
| Limestone aggregate | 1750 |
| Kiln dust | 150 |
| Water | 32.05 Gallons/Cu. Yd. (7.92 Gallons/Sack cement) |
| Air-entraining agent | 1.75 oz./Sack cement |

The amount of manufactured fine aggregate was increased from the 1350 pounds present in the batch composition of Sample 2 to maintain the total batch dry weight nearly equal to the batch weights of Example I, II and in the foregoing control. Compressive strength test results for the composition above, containing 10 percent precipitator lime and 4.5 sacks of cement, are shown in Table III. Also shown in Table III are compressive strength test results from the control sample previously described in Example II, containing no precipitator lime and 5.5 sacks of cement.

TABLE III

| Sample | % Precipitator lime | COMPRESSIVE STRENGTH (psi) | | | | | | | |
|---|---|---|---|---|---|---|---|---|---|
| | | 3 | 3 | 7 | 7 | Days Aged 14 | 14 | 28 | 28 |
| Control | — | 2211 | 2158 | 2723 | 2776 | 2794 | 2918 | 3165 | 3290 |
| 4 | 10 | 2158 | 2229 | 2564 | 2688 | 2953 | 2812 | 3237 | 3095 |

The test results shown above indicate that the presence of 10 percent by weight of precipitator lime, based on the manufactured fine aggregate present in a composition containing 4.5 sacks of portland cement produces a compressive strength nearly equivalent to that of a control batch containing no precipitator lime and 5.5 sacks of portland cement. The results indicate that a substantial and significant reduction in the amount of portland cement present in a concrete composition can be obtained by the use of precipitator lime.

In the preceding examples the compositions of the invention contain from about 33.8 to 38.1 percent by weight of dolomitic limestone as a low-silica manufactured fine aggregate.

It will be appreciated that while the batch compositions disclosed include coarse limestone aggregate, the presence of such coarse aggregate is not essential to the invention. As is known in the art, the ratio of Portland cement, coarse aggregate, fine aggregate and water is adjusted to produce a concrete having a desired slump. The coarse aggregate serves as a diluent, helping to control the chemical reactions which the concrete undergoes upon setting up; rapid setting is not desirable or permitted by standard specifications, because the cement sets up so rapidly that it cannot be worked in the form before stiffening occurs. In certain applications, more rapid setting may be desirable, and therefore the absence of coarse aggregate may not be undesirable It will be appreciated that compositions which do not contain coarse limestone aggregate will benefit from the presence of kiln dust in a manner similar to the benefits disclosed hereinbefore.

The deleterious effect of magnesia is generally attributed to the possibility of expansive reactions due, it is believed, to the hydration products produced when the oxide is cured over extended periods of time in moisture. However, testing results indicate that such undesirable expansion does not occur in the cured concrete of the instant invention.

For purposes of comparison, but not in accordance with the instant invention, tests were conducted to determine whether similar beneficial results could be obtained by adding kiln dust to a concrete in which the manufactured fine aggregate is replaced by natural sand.

A composition was prepared by dry-mixing coarse limestone aggregate, Type I portland cement, natural sand, and dust from a dolomitic limestone kiln. Water was then added to the dry mix and the composition mixed for 5 minutes. A control composition, based on 1500 pounds of natural sand and containing no precipitator lime was also prepared and tested at the same time.

| | Weight (Pounds) | |
|---|---|---|
| | Control | Sample 5 |
| Type I cement | 517 (5.5 sacks) | 517 (5.5 sacks) |
| Natural sand | 1500 | 1350 |
| Limestone aggregate | 1750 | 1750 |

-continued

|  | Weight (Pounds) | |
| --- | --- | --- |
|  | Control | Sample 5 |
| Kiln dust | — | 150 |
| Water (gallons/cu. yd.) | 25 | 25 |

The natural sand used was Ottawa silica sand, having the following approximate screen analysis:

| Screen | Percent Cumulative | Percent Pass |
| --- | --- | --- |
| 4 | 2.5 | 97.5 |
| 8 | 7.9 | 92.1 |
| 16 | 35.3 | 64.7 |
| 30 | 58.7 | 41.3 |
| 50 | 85.1 | 14.9 |
| 100 | 97.6 | 2.4 |
| 200 | 99.4 | 0.6 |

The compressive strength of the composition was determined as described in Example I.

TABLE IV

| Sample | % Precipitator lime | COMPRESSIVE STRENGTH Days Aged | | |
| --- | --- | --- | --- | --- |
| | | 3 | 7 | 14 |
| Control | — | 2299 | 3183 | 3555 |
| 5 | 10 | 2458 | 2953 | 3343 |

The test results shown above indicate that the presence of kiln dust does not improve the compressive strength of a concrete composition based on natural sand, in comparison to the beneficial increase in compressive strength obtained by addition of the kiln dust to a concrete composition based on manufactured fine aggregate.

While the reaction mechanism whereby addition of the kiln dust to the concrete composition increases the compressive strength of the composition is not known, it is theorized that the increase in compressive strength occurs by reaction between the reactive CaO and MgO of the kiln dust with the manufactured fine aggregate. The small particle sizing of the kiln dust is believed to enhance the reactivity.

What we claim is:

1. A cementitious structural composition consisting essentially of Portland cement, dolomitic limestone as a low-silica manufactured fine aggregate, water and from about 5 to 15 percent by weight, based on the manufactured fine aggregate, of a precipitate comprising CaO-MgO from the gaseous effluent from a kiln burning dolomitic limestone, said precipitate having a particle size essentially less than 5 microns.

2. A composition as claimed in claim 1 additionally containing a coarse limestone aggregate.

3. A composition as claimed in claim 1 wherein the precipitate contains from about 34.4 to 38.1 percent by weight calcium, calculated as CaO and from about 25.4 to 36.1 percent by weight magnesium, calculated as MgO.

4. A composition as claimed in claim 2 wherein the precipitate has a calcium content calculated as CaO of about 35 percent by weight and a magnesium content calculated as MgO of about 26 percent by weight.

5. A cementitious structural composition consisting of from 11 to 14 percent by weight Portland cement, from about 33.8 to 38.1 percent by weight of dolomitic limestone as a low-silica manufactured fine aggregate, about 46 percent by weight coarse limestone aggregate, from about 5 to 15 percent by weight, based on the manufactured fine aggregate, of a precipitate comprising CaO-MgO from the gaseous effluent from a kiln burning dolomitic limestone, said precipitate having a particle sizing of essentially less than 5 microns and sufficient water to form a workable mixture.

6. A composition as claimed in claim 1 wherein the manufactured fine aggregate contains 30 percent by weight calcium, calculated as CaO and about 22 percent by weight magnesium, calculated as MgO.

* * * * *